(12) United States Patent
Ono et al.

(10) Patent No.: US 9,282,270 B2
(45) Date of Patent: Mar. 8, 2016

(54) PHOTOELECTRIC CONVERSION DEVICE, IMAGING SYSTEM, AND METHOD FOR DRIVING PHOTOELECTRIC CONVERSION DEVICE

(71) Applicant: CANON KABUSHIKI KAISHA, Tokyo (JP)

(72) Inventors: Toshiaki Ono, Ebina (JP); Kazumichi Morita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 14/475,365

(22) Filed: Sep. 2, 2014

(65) Prior Publication Data
US 2015/0062395 A1 Mar. 5, 2015

(30) Foreign Application Priority Data
Sep. 5, 2013 (JP) ................................. 2013-184058

(51) Int. Cl.
H04N 5/347 (2011.01)
H04N 5/3745 (2011.01)
H04N 5/361 (2011.01)
H04N 5/378 (2011.01)

(52) U.S. Cl.
CPC ........... *H04N 5/37457* (2013.01); *H04N 5/347* (2013.01); *H04N 5/378* (2013.01)

(58) Field of Classification Search
CPC ..... H04N 5/347; H04N 5/361; H04N 5/2176; H04N 5/37457; H04N 5/378

USPC ............... 348/294–297, 300, 308; 250/208.1; 257/159, 233, 291, 292, 444
See application file for complete search history.

(56) References Cited

U.S. PATENT DOCUMENTS

| 7,456,886 B2* | 11/2008 | Shinohara | H04N 5/361 348/308 |
| 2009/0033779 A1* | 2/2009 | Mo | H04N 5/361 348/308 |
| 2011/0141325 A1* | 6/2011 | Nakajima | H04N 5/367 348/246 |
| 2013/0161487 A1* | 6/2013 | Sakaguchi | H01L 27/14601 250/208.1 |
| 2013/0182161 A1* | 7/2013 | Nakajima | H04N 5/335 348/300 |

FOREIGN PATENT DOCUMENTS

JP 2004-134867 A 4/2004

* cited by examiner

*Primary Examiner* — Tuan Ho
*Assistant Examiner* — Marly Camargo
(74) *Attorney, Agent, or Firm* — Canon USA, Inc. IP Division (57) ABSTRACT

An AD conversion unit AD-converts a first analog signal output from a clamping unit and generated based on a signal generated at a first photoelectric conversion unit. Then, while the first analog signal is clamped at a reference level, signals generated based on the signals generated at the first and second photoelectric conversion units are applied to the clamping unit, whereby the AD conversion unit AD-converts a second analog signal output from the clamping unit.

16 Claims, 9 Drawing Sheets

PHOTOELECTRIC CONVERSION DEVICE, IMAGING SYSTEM, AND METHOD FOR DRIVING PHOTOELECTRIC CONVERSION DEVICE

BACKGROUND OF THE INVENTION

1. Field of the Invention

The present invention relates to a photoelectric conversion device, an imaging system, and a method for driving a photoelectric conversion device.

2. Description of the Related Art

Japanese Patent Application Laid-Open No. 2004-134867 discloses a plurality of pixel units each including an amplification MOS transistor provided in common for two photodiodes. Japanese Patent Application Laid-Open No, 2004-134867 further discloses that the two photodiodes included in the pixel unit are connected to the common amplification MOS transistor.

In Japanese Patent Application Laid-Open No. 2004-134867, electric charge is generated by one of the two photodiodes included in the pixel unit, and the electric charge is transferred to a gate node of the amplification MOS transistor to read a signal from the pixel unit. Electric charge generated by the other of the two photodiodes is transferred to the gate node of the amplification MOS transistor, to read a signal from the pixel unit, the signal corresponding to the total amount of electric charge generated by the two photodiodes.

A technique for providing an analog-to-digital (AD) converter corresponding to each of columns of a pixel array in which pixels are arranged in a matrix form is known. As an example, it is known that the AD converter provides a digital signal by comparing a reference signal monotonously changed with time and an analog signal with each other.

If an AD converter is provided at each of vertical signal lines, in an imaging device described in Japanese Patent Application Laid-Open No. 2004-134867, time required for AD conversion of a signal from two photodiodes is twice the time required for AD conversion of the signal from one photodiode. Therefore, it is difficult to speed up the operation of a sensor by simply providing the AD conversion circuit for each column of the pixel array.

SUMMARY OF THE INVENTION

A photoelectric conversion device of one aspect of the present invention includes:
a cell array having a plurality of unit cells arranged in a matrix;
a plurality of clamping units each provided corresponding to a column of the cell array; and
a plurality of analog-to-digital (AD) conversion units each configured to convert a signal output from a corresponding clamping unit to a digital signal,
each of the plurality of unit cells having:
a first photoelectric conversion unit;
a second photoelectric conversion unit; and
an intra-cell amplification unit configured to amplify signals generated by the first and second photoelectric conversion units,
wherein each of the plurality of AD conversion units AD-converts a first analog signal based on a signal generated at the first photoelectric conversion unit and output from the clamping unit,
and AD-converts a second analog signal output from the clamping unit by applying a signal based on the signals generated by the first and second photoelectric conversion units to the clamping unit while the first analog signal is clamped at a reference level.

A method for driving a photoelectric conversion device of another aspect of the present invention includes:
a cell array having a plurality of unit cells arranged in a matrix form; and
a plurality of clamping units provided corresponding to columns of the cell array;
the plurality of unit cells each including:
a first photoelectric conversion unit;
a second photoelectric conversion unit; and
an intra-cell amplification unit configured to amplify signals generated at the first and second photoelectric conversion units, the method including:
AD-converting a first analog signal based on a signal generated at the first photoelectric conversion unit and output from a clamping unit by comparing the first analog signal with a reference signal changing with time; and
AD-converting a second analog signal output from the clamping unit by applying a signal based on the signals generated by the first and second photoelectric conversion units to the clamping unit while the first analog signal is clamped at a reference level.

Further features of the present disclosure will become apparent from the following description of exemplary embodiments (with reference to the attached drawings).

DESCRIPTION OF THE EMBODIMENTS

First Embodiment

Figure 1:
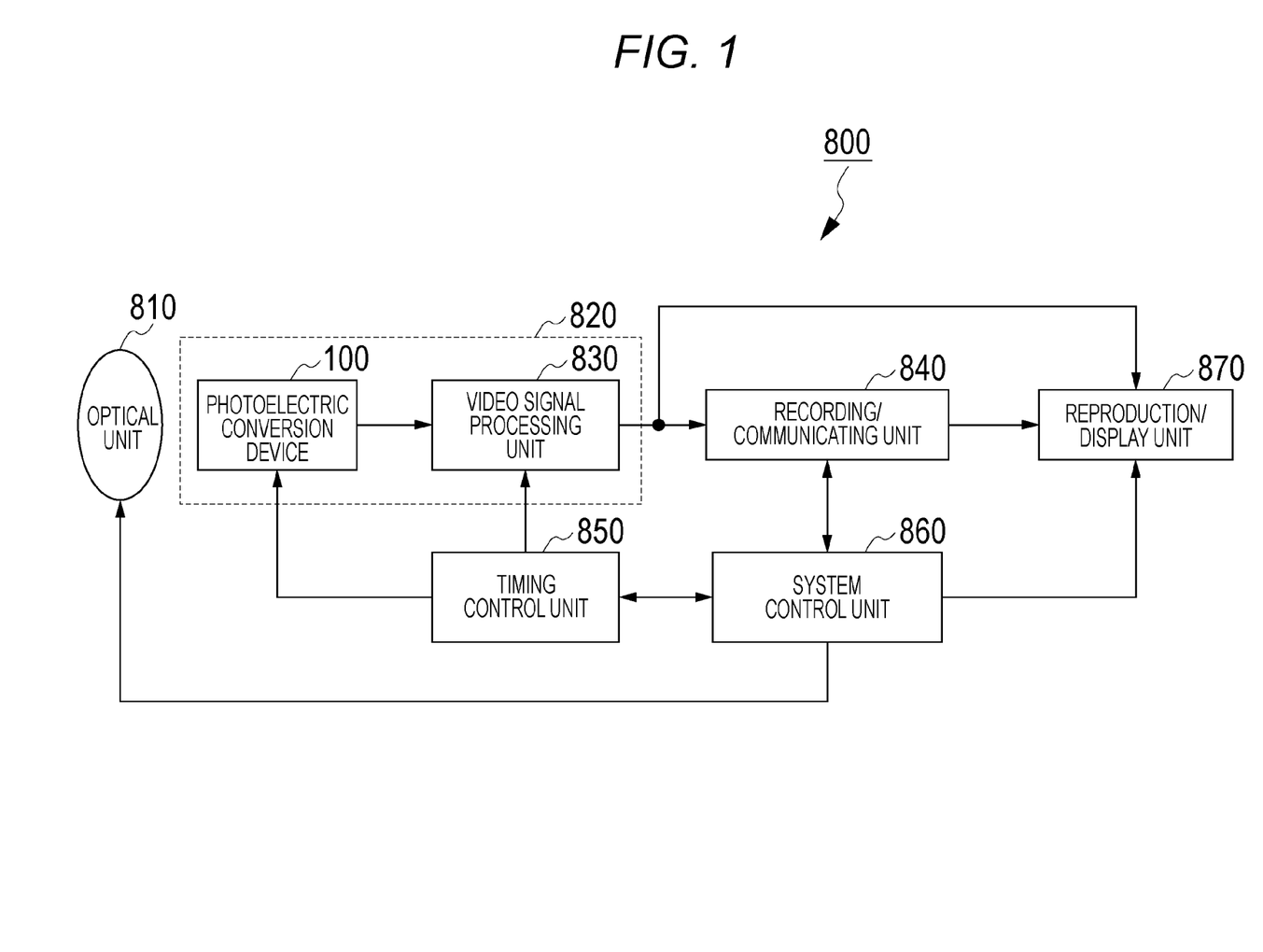
FIG. 1 is a diagram showing an exemplary structure of an imaging system.

FIG. 1 is a diagram showing an exemplary structure of an imaging system according to a first embodiment of the present invention. An imaging system 800 includes, for example, an optical unit 810, a photoelectric conversion device 100, a video signal processing unit 830, a recording/communicating unit 840, a timing control unit 850, a system control unit 860, and a reproduction/display unit 870. An imaging device 820 includes the photoelectric conversion device 100 and the video signal processing unit 830.

The optical unit 810 having an optical system such as a lens is configured such that light from an object forms an image on a pixel portion, or a cell array 10 of the photoelectric conversion device 100 in which a plurality of pixels is two-dimensionally arranged, for formation of an image of the object.

The photoelectric conversion device 100 outputs a signal according to the light forming an image on the pixel portion 10 with timing based on a signal from the timing control unit 850. The signal output from the photoelectric conversion device 100 is input into the video signal processing unit 830 serving as a video signal processing unit, and the video signal processing unit 830 processes the signal according to a procedure defined by a program or the like. The signal obtained by the processing at the video signal processing unit 830 is transmitted as image data to the recording/communicating unit 840. The recording/communicating unit 840 transmits a signal for forming an image to the reproduction/display unit 870, and the reproduction/display unit 870 reproduces and displays a moving image or a still image thereon. The recording/communicating unit 840 receives a signal from the video signal processing unit 830 for communication with the system control unit 860, and further records the signal for forming an image in a recording medium not shown.

The system control unit 860 integrally controls the operation of the imaging system, and controls the driving of the optical unit 810, the timing control unit 850, the recording/communicating unit 840, and the reproduction/display unit 870. The system control unit 860 includes a storage device, not shown, serving as for example a recording medium, and the storage device records a program or the like required for controlling the operation of the imaging system. Into the imaging system, the system control unit 860 supplies a signal for switching driving modes according to for example the operation of a user. In particular, switching of the driving modes includes change of rows to be read or to be reset, change of a field angle with electronic zooming, shift of the field angle with electronic image stabilizing function, or the like. The timing control unit 850 controls the timing of driving the photoelectric conversion device 100 and the video signal processing unit 830 based on the control of the system control unit 860.

Figure 2:
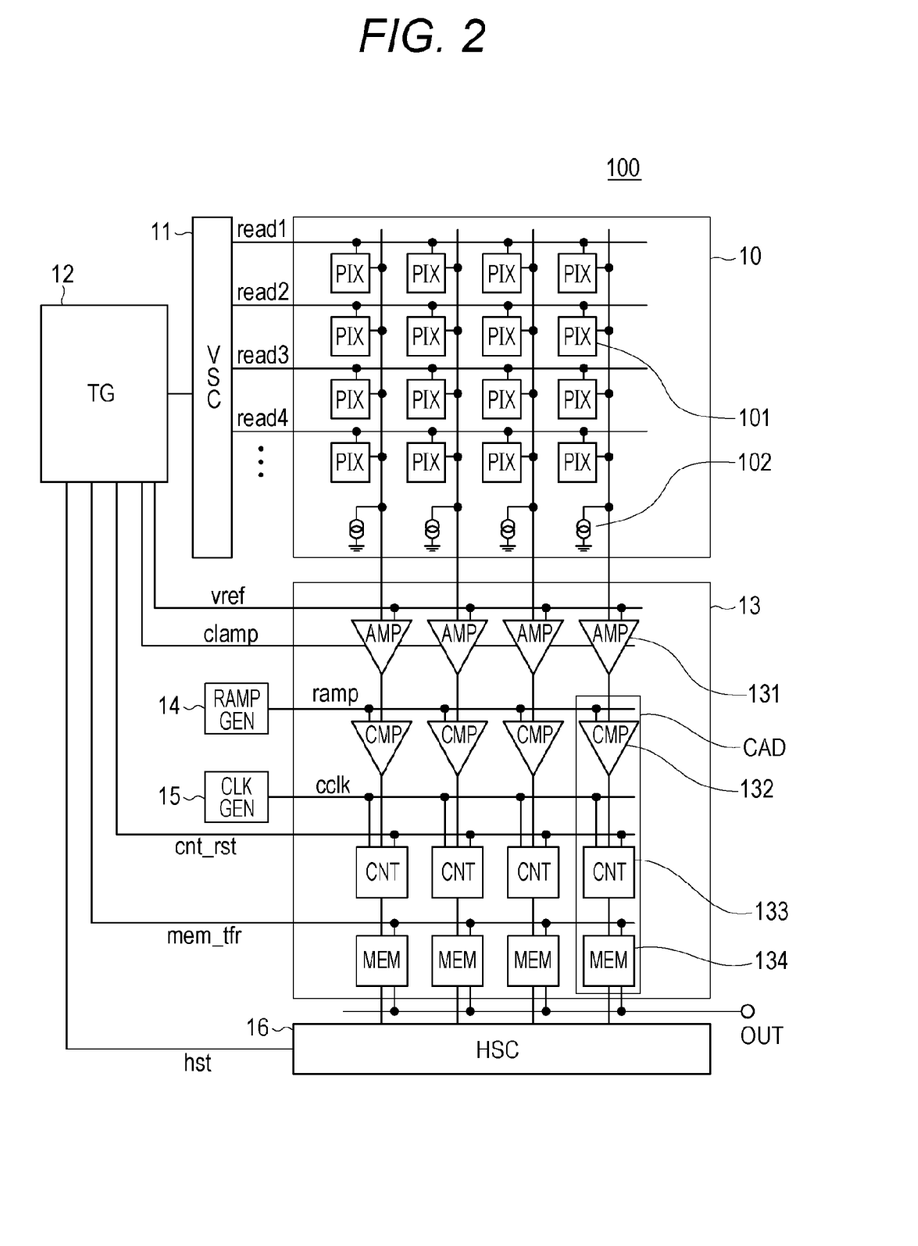
FIG. 2 is a diagram showing an exemplary structure of a photoelectric conversion device.

FIG. 2 is a block diagram of an exemplary structure of the photoelectric conversion device 100 of the present embodiment.

The photoelectric conversion device 100 includes a cell array 10, a vertical scanning unit 11, a timing generation unit 12, a reading unit 13, a reference signal generation unit 14, a clock generation unit 15, and a horizontal scanning unit 16. The clock generation unit 15 may be configured as part of the timing generation unit 12. In the present embodiment, a column comparison unit 132, a first column counter unit 133, and a column memory 134 constitute a column AD conversion unit.

The cell array 10 includes a plurality of unit cells 101 arranged in a matrix form. The unit cells 101 provided in the same column of the cell array 10 are connected to a column clamping unit 131 through a corresponding signal line VLn. A reference sign n represents the n-th column from the left in FIG. 2. Operation of the unit cells 101 is controlled by the vertical scanning unit 11 for each row.

The column clamping unit 131 of each column has two input nodes. One of the input nodes receives a signal from the signal line VLn, and the other receives a reference voltage Vref fed from the timing generation unit 12. The reference voltage Vref may be fed not from the timing generation unit 12 but from a power source. The column clamping unit 131 has an output node which is connected to one of the input nodes of the column comparison unit 132.

The other input node of the column comparison unit 132 receives a reference signal ramp supplied from the reference signal generation unit 14. The column comparison unit 132 has an output node which is connected to a latch node of the first column counter unit 133.

The first column counter unit 133 receives a counter reset signal cnt_rst from the timing generation unit in addition to the output from the column comparison unit 132, and further receives a counting clock signal cclk from the clock generation unit 15. The first column counter unit 133 resets a count value by the counter reset signal cnt_rst. The first column counter unit 133 performs counting operation according to the counting clock signal cclk. The counting operation may include count-up operation, i.e., increment of a count value, or count-down operation, i.e., decrement of the count value, and the first column counter unit 133 may be configured to switch between the count-up operation and the count-down operation. Output from the first column counter unit 133 is connected to the column memory 134.

The column memory 134 receives a count value transfer signal mem_tfr from the timing generation unit in addition to the output from the first column counter unit 133. The column memory holds a count value output from the first column counter unit 133 according to the count value transfer signal mem_tfr. The count values held in the column memories 134 are sequentially output to an output line by being selected by the horizontal scanning unit 16.

Figure 3:
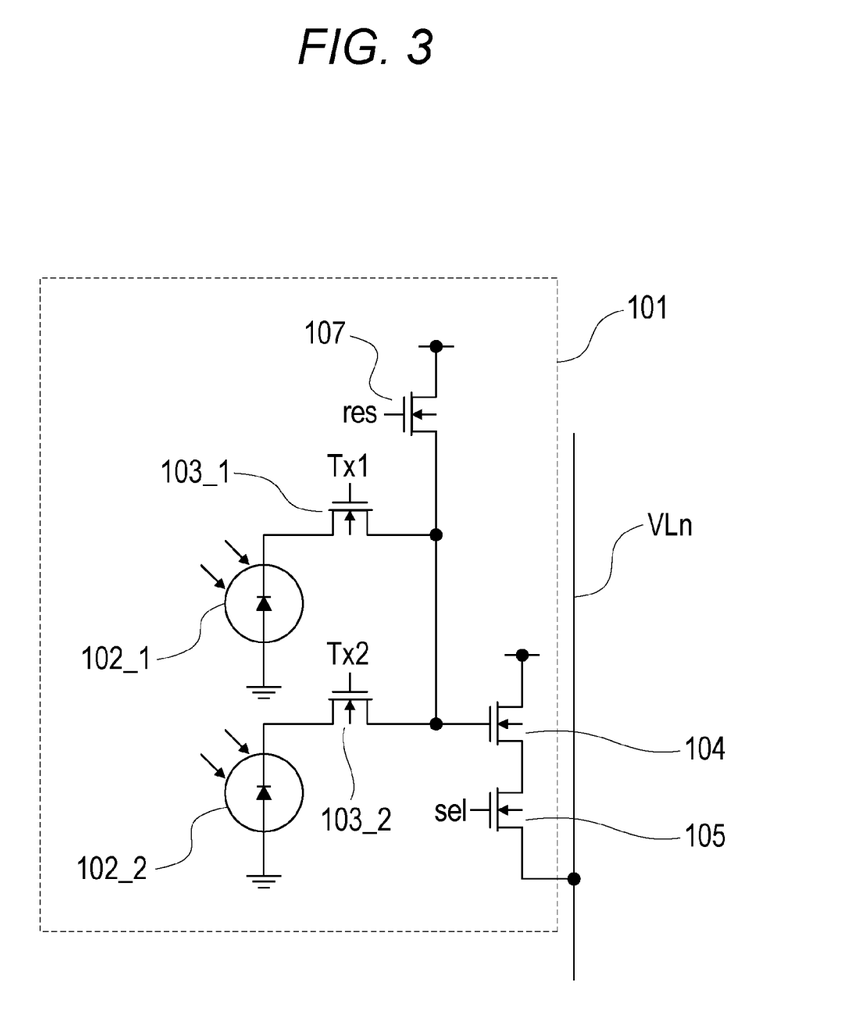
FIG. 3 is a diagram showing an exemplary structure of a unit cell.

FIG. 3 is a diagram showing an exemplary structure of the unit cell 101 of the present embodiment.

The unit cell 101 includes photodiodes 102_1 and 102_2, transfer transistors 103_1 and 103_2, an amplification transistor 104, a selection transistor 105, and a reset transistor 107.

The photodiode 102_1 as the first photoelectric conversion unit and the photodiode 102_2 as the second photoelectric conversion unit have cathodes which are connected to a gate of the amplification transistor 104 via the corresponding transfer transistors 103_1 and 103_2, respectively. The amplification transistor 104, as an intra-cell amplification unit, has a drain connected to a power source, and a source connected to the signal line VLn through the selection transistor 105. When the selection transistor 105 is turned on, the amplification transistor 104 constitutes a source follower circuit together with a current source 106. The transfer transistors 103_1 and 103_2, the selection transistor 105, and the reset transistor 107 are switched between on and off by signals tx1, tx2, sel, and res, respectively.

The reset transistor 107 resets the potential of the gate of the amplification transistor 104.

Figure 4:
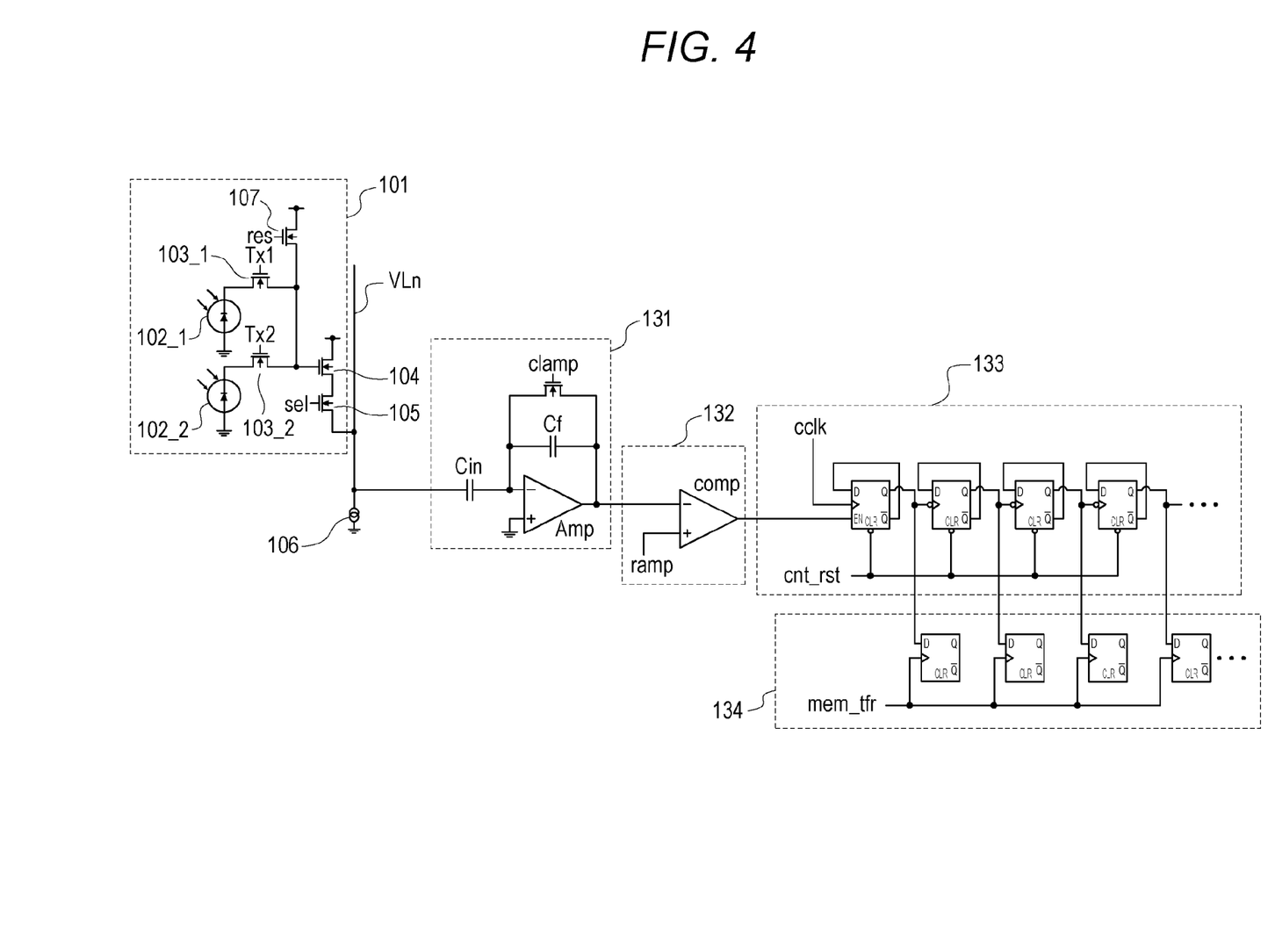
FIG. 4 is an equivalent circuit diagram of a part of the photoelectric conversion device.

FIG. 4 is an equivalent circuit diagram showing one unit cell 101 and the column clamping unit 131, the column comparison unit 132, the first column counter unit 133, and the column memory 134 of a column corresponding to the one unit cell in the photoelectric conversion device of the present embodiment.

In the present embodiment, the column clamping unit 131 includes a clamp capacitance Cin, a differential amplifier Amp, a feedback capacitance Cf, and a clamp switch clamp. The signal line VLn is connected to an inverting input node of the differential amplifier Amp through the clamp capacitance Cin. The inverting input node and an output node of the differential amplifier Amp are connected to each other through the feedback capacitance Cf and the clamp switch clamp which are provided in parallel. A reference voltage Vref is applied to a non-inverting input node of the differential amplifier Amp. In the present embodiment, the column clamping unit 131 also includes a function as a clamping unit in addition to the signal amplification function.

In FIG. 4, unit counters corresponding to four least significant bits of unit counters constituting the first column counter unit 133 are shown.

Similarly, in FIG. 4, unit memories corresponding to four least significant bits unit memories constituting the column memory 134 are shown.

Figure 5:
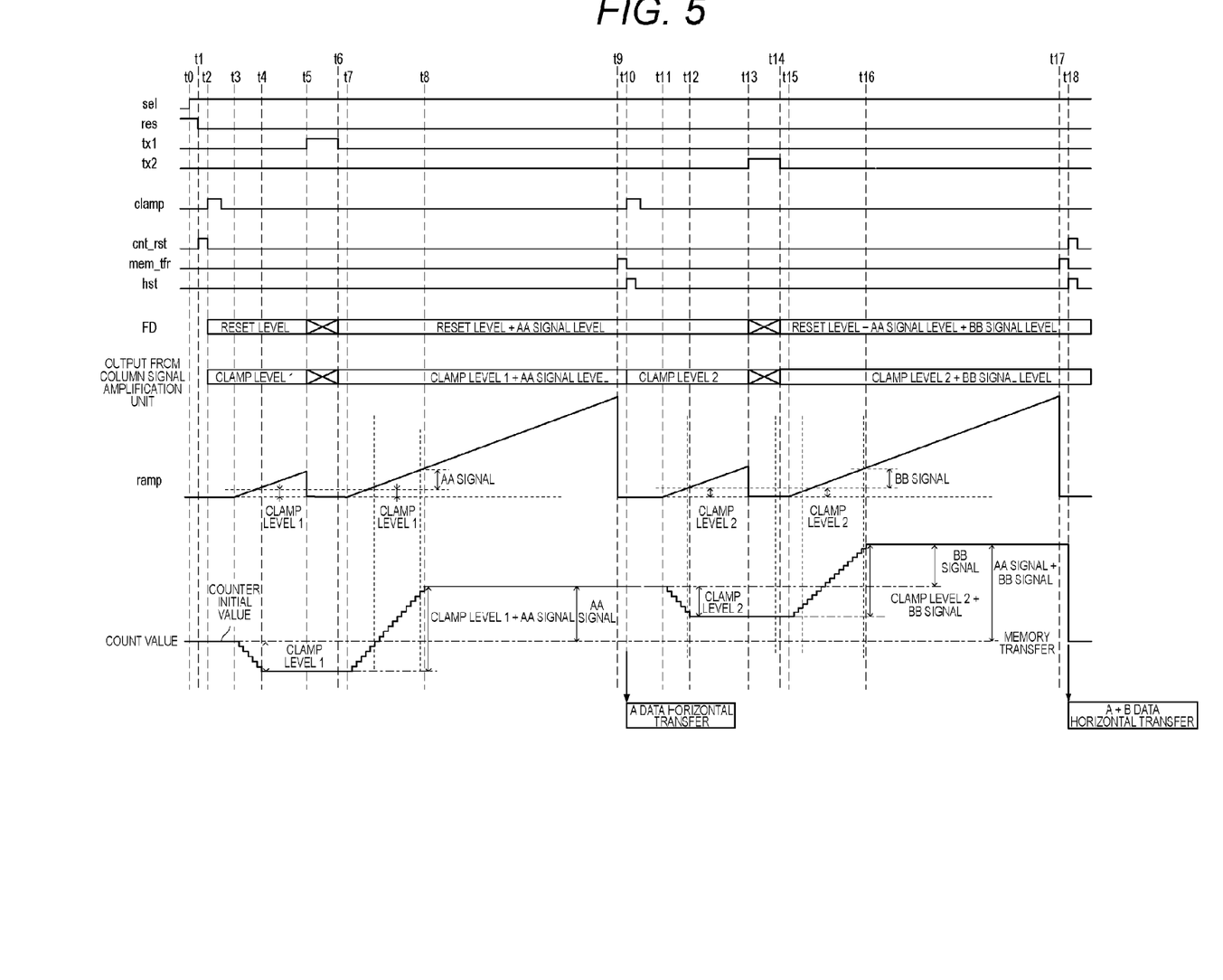
FIG. 5 is a diagram showing an exemplary operation according to an embodiment of the present invention.

FIG. 5 is a timing chart showing operation of the present embodiment. Operation for reading a signal from one unit cell will be described here. In the following description, when signals are at a high level (hereinafter referred to as an H level), corresponding transistors are turned on, and when the signals are at a low level (hereinafter referred to as an L level), corresponding transistors are turned off.

In FIG. 5, "FD" shows a schematic potential profile of a gate node, i.e., floating diffusion (FD) portion, of the amplification transistor 104.

At time t0, a signal sel transits from the L level to the H level. The selection transistor 105 is thus turned on, and the amplification transistor 104 is operated as the source follower circuit together with the current source 106.

When a signal res turns to the L level at time t1, the reset transistor 107 is turned off, and a reset condition of the gate node of the amplification transistor 104 is released. When the reset condition of the gate node of the amplification transistor 104 is released, the potential of the FD portion has a potential in which random noise caused by turning off the reset transistor 107 is superposed. The potential at that time is expressed as a "reset level".

When the signal cnt_rst is temporarily at the H level from the time t1, the count value of the first column counter unit 133 is reset to an initial value.

When a signal clamp temporarily turns to the H level from time t2, the clamp switch clamp is turned on. Thus, both nodes of the feedback capacitance Cf and the inverting input node and the output node of an inverting amplifier Amp are short-circuited. The output from the column clamping unit 131 at that time is expressed as a "clamp level 1". In such a state, at both ends of the clamp capacitance Cin, a potential difference being a difference between the output of the unit cell 101 according to a reset level of the FD portion and the clamp level 1 is applied. When the signal clamp turns to the L level, the clamp switch clamp is turned off. Accordingly, the column clamping unit 131 is operated as an amplification circuit for a gain defined by a ratio of a capacitance value of the clamp capacitance Cin to a capacitance value of the feedback capacitance Cf. The following description will be made, on condition that the capacitance values of the clamp capacitance and the feedback capacitance are equal to each other.

From time t3, variation of the signal level of the reference signal ramp is started, and the first column counter unit 133 starts the counting operation. Any reference signal ramp monotonously varying with the passage of time may be employed, and the reference signal may change in a slopewise or a stepwise manner. During this period, the first column counter unit 133 performs the count-down operation, i.e., decrement of the count value.

Thereafter, in response to the reference signal ramp exceeding the clamp level 1, the output from the column comparison unit 132 is switched. As a result, counting operation of the first column counter unit 133 stops at time t4. A count value held at time t4 by the first column counter unit 133 is a digital value obtained by AD-converting the clamp level 1.

At time t5, the change of the reference signal ramp with respect to time is finished, and the reference signal returns to an initial value.

When the signal tx1 turns to the H level at time t5, the transfer transistor 103_1 is turned on. As a result, the electric charge stored in the photodiode 102_1 is transferred to the FD portion.

When the signal tx1 turns to the L level at time t6, the transfer transistor is turned off. As a result, the transfer of the electric charge from the photodiode 102_1 to the FD is finished. As a result, the FD portion has a potential in which a difference in voltage according to the amount of electric charges transferred from the photodiode 102_1 is superposed on the reset level. This difference is expressed as "AA signal level". In other words, the potential of the FD portion is expressed as "reset level+AA signal level" from time t6. Accordingly, the output from the column clamping unit 131 is expressed as "clamp level 1+AA signal level".

From time t7, AD conversion is performed with the output "clamp level 1+AA signal level" as a first analog signal. From time t7, variation of the signal level of the reference signal ramp is started, and countdown operation of the first column counter unit 133 is started. In a period starting from time t8, the first column counter unit 133 performs count-up operation, i.e., increment of the count value unlike time t3 to t5.

Thereafter, in response to the reference signal ramp exceeding the clamp level 1+AA signal, the output from the column comparison unit 132 is switched. At time t8, counting operation of the first column counter unit 133 is stopped. A count value held by the first column counter unit 133 at time t8 is a digital value obtained by adding an AD-converted AA signal to the counter initial value. This is because the first column counter unit 133 has performed count-up operation from time t7, after the count-down operation, with respect to the clamp level 1 held at time t4, and thus a digital value corresponding to the clamp level 1 is cancelled.

At time t9, change of the reference signal ramp with respect to time is finished, and the reference signal returns to the initial value.

When the signal mem_tfr turns to the H level at time t9, a count value held at that time by the first column counter unit 133 is written into the column memory 134.

When the signal mem_tfr turns to the L level at time t10, the column memory 134 holds the written count value.

When the signal hst turns temporarily to the H level from time t10, scanning of the column memory 134 by the horizontal scanning unit 16 is started (operation of "AA data horizontal transfer").

When the signal clamp turns temporarily to the H level from time t10, the clamp switch clamp is turned on. Both nodes of the feedback capacitance Cf and the inverting input node and the output node of the inverting amplifier Amp are short-circuited. The output from the column clamping unit 131 at that time is expressed as a "clamp level 2". In such a state, a potential difference is applied to both ends of the clamp capacitance Cin. The potential difference is a difference between the clamp level 2 and the output from the unit cell 101 according to the "reset level of the FD portion+AA signal level". When the signal clamp turns to the L level, the clamp switch clamp is turned off. Accordingly, the column clamping unit 131 operates as the amplification circuit with the gain defined by the ratio of the capacitance value of the clamp capacitance Cin to the capacitance value of the feedback capacitance Cf.

From time t11, change of the signal level of the reference signal ramp with respect to time is started, and counting operation of the first column counter unit 133 is started. During this period, the first column counter unit 133 performs the count-down operation, i.e., decrement of the count value.

The counting operation is performed from time t11 with respect to the AA signal held at time t8.

Thereafter, in response to the reference signal ramp exceeding the clamp level 2, output from the column comparison unit 132 is switched. At time t12, the counting operation of the first column counter unit 133 is stopped. A count value held by the first column counter unit 133 at time t12 is a digital value corresponding to a value obtained by AD-converting a signal in which the clamp level 2 is subtracted from the AA signal.

At time t13, change of the reference signal ramp with respect to time is finished, and the reference signal returns to the initial value.

When the signal tx2 turns to the H level at time t13, the transfer transistor 103_2 is turned on. As a result, the electric charge stored in the photodiode 102_2 is transferred to the FD portion.

When the signal tx2 turns to the L level at time t14, the transfer transistor is turned off. Thus, transfer of the electric charge from the photodiode 102_2 to the FD portion is finished. As a result, the FD portion has a potential in which a difference in voltage according to the amount of electric charges transferred from the photodiode 102_2 is superposed on the "reset level+AA signal level". The difference is expressed as "BB signal level". That is, the potential of the FD portion is expressed as "reset level+AA signal level+BB signal level" from time t14. On the other hand, the column clamping unit 131 is configured such that operation at time t10 clamps the potential "reset level+AA signal level" to the potential "clamp level 2" as a reference level. Accordingly, the output from the column clamping unit 131 is expressed as "clamp level 2+BB signal level".

From time t15, AD conversion is performed with the potential "clamp level 2+BB signal level" as a second analog signal. From time t15, change of the signal level of the reference signal ramp with respect to time is started, and countdown operation of the first column counter unit 133 is started. In a period starting from time t15, the first column counter unit 133 performs count-up operation, i.e., increment of the count value, unlike times t11 to t13.

After the reference signal ramp exceeds the "clamp level 2+BB signal", the output from the column comparison unit 132 is switched. At time t16, counting operation of the first column counter unit 133 is stopped. A count value held by the first column counter unit 133 at time t16 is a digital value obtained by AD-converting a signal in which the AA signal and the BB signal are added. This is because the first column counter unit 133 has performed count-up operation from time t15, after the count-down operation, based on the clamp level 2 held at time t12, and thus a digital value corresponding to the clamp level 2 is cancelled.

At time t17, time variation of the reference signal ramp is finished, and the reference signal returns to the initial value.

When the signal mem_tfr turns to the H level at time t17, the count value held by the first column counter unit 133 at that time is written into the column memory 134.

When the signal mem_tfr turns to the L level at time t18, the column memory 134 holds the count value written therein.

When the signal hst is temporarily at the H level from time t18, scanning of the column memory 134 by the horizontal scanning unit 16 is started (operation of "A+B data horizontal transfer").

When the signal cnt_rst turns to the H level at time t18, the count value of the first column counter unit 133 is reset.

Through the above-mentioned process, operation of obtaining a signal from one row of the unit cell of the cell array 10 is completed. In order to obtain the "BB signal level", differential processing between data output from the photoelectric conversion device by the operation of "AA+BB data horizontal transfer", and data output from the photoelectric conversion device by the operation of the "AA data horizontal transfer" may be performed, for example, at the video signal processing unit.

The operation described above will be briefly described below. After the signal from one of the two photodiodes included in the unit cell is AD-converted, the signal obtained based on both of the photodiodes is applied to the clamping unit while the signal based on the one photodiode is clamped at the reference level. The signal output from the clamping unit is thus AD-converted.

According to the present embodiment, the BB signal level is superposed on the "reset level+AA signal level" having been clamped, the signal corresponding to the "BB signal level" is AD-converted, and a period required for the AD-conversion can be reduced. If the clamping operation is not performed, a period between time t15 to t17 requires a length approximately twice the length of time required in the present embodiment. Further, a signal range in which the reference signal ramp changes requires a range approximately twice the range required in the present embodiment. Therefore, without the present embodiment, the column comparison unit 132 needs to have an unnecessarily broad dynamic range.

A column AD conversion unit CAD includes the column memory 134. Therefore, the "A data horizontal transfer" performed from time t10 and the counting operation, or the AD conversion, performed from time t11 may be performed in parallel. Such a configuration further speeds up the operation of the photoelectric conversion device.

Second Embodiment

Figure 6:
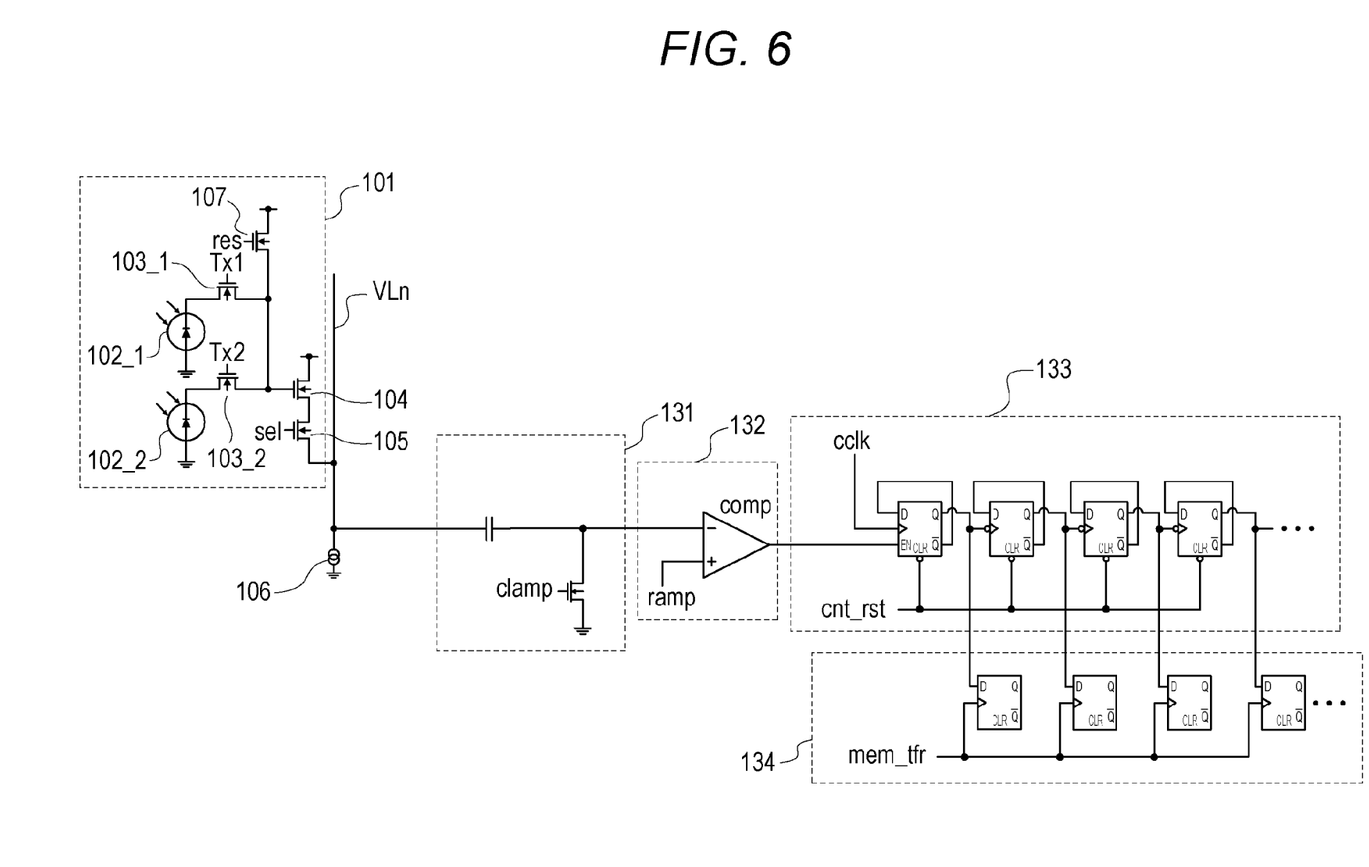
FIG. 6 is an equivalent circuit diagram of a part of the photoelectric conversion device.

FIG. 6 is an equivalent circuit diagram showing one unit cell 101 and a column clamping unit 131, a column comparison unit 132, a first column counter unit 133, and a column memory 134 of a corresponding column in a photoelectric conversion device of the present embodiment.

The second embodiment is different from the first embodiment in that the column clamping unit 131 is constituted by a clamp capacitance Cin and a clamp switch clamp. Operation of the present embodiment is performed according to the timing chart of FIG. 5.

According to the present embodiment, a BB signal level is superposed on "reset level+AA signal level" having been clamped, a signal corresponding to the "BB signal level" is AD-converted, and a period required for the AD conversion is reduced.

Third Embodiment

Figure 7A:
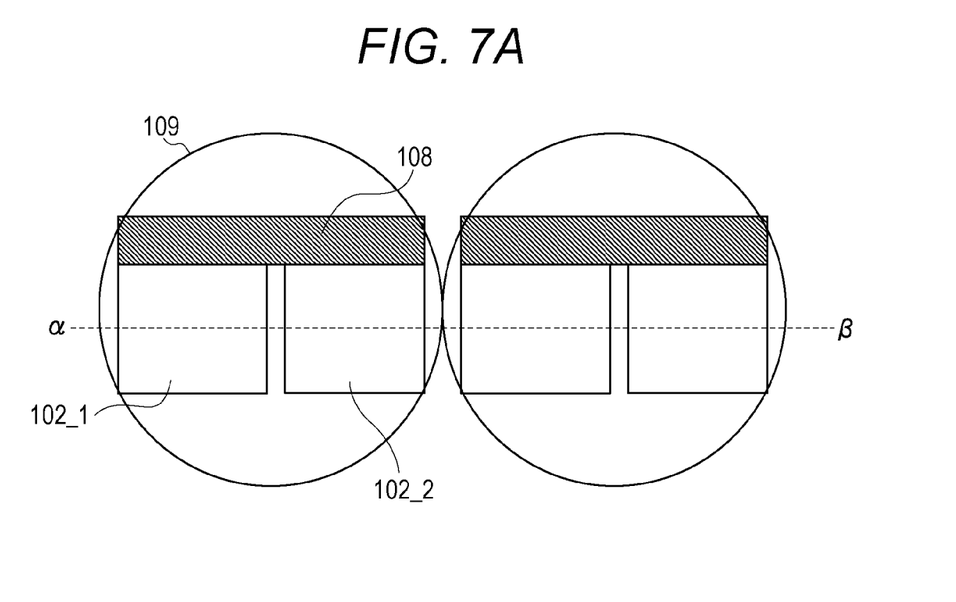
FIG. 7A is a plan layout view of unit cells.

FIG. 7A is a plan layout view showing an exemplary configuration of unit cells 101 of the present embodiment. FIG. 7A shows two adjacent unit cells 101 in the same row.

Components of the unit cell 101, excluding photodiodes 102_1 and 102_2, are indicated by hatching 108. The photodiodes 102_1 and 102_2 are provided side by side in a direction along a row of a cell array 10. A microlens 109 configured to collect incident light is provided above the photodiode 102_1 and the photodiode 102_2. Further, a color filter, not shown in FIG. 7A, may be provided.

Figure 7B:
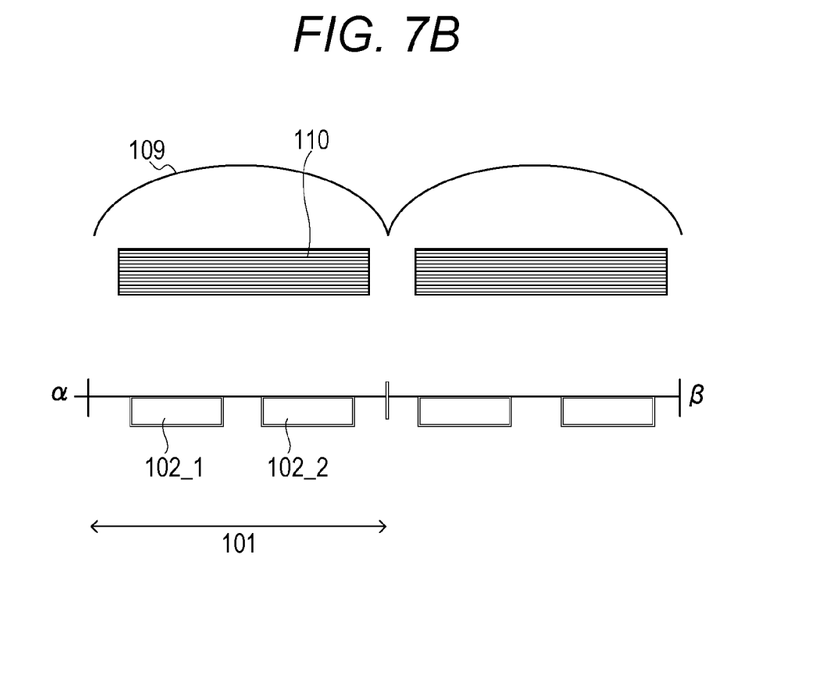
FIG. 7B is a cross-sectional view of the unit cells.

FIG. 7B is a cross-sectional view taken along line α-β in FIG. 7A. FIG. 7B shows the color filter 110 and the microlens 109 provided above the photodiodes 102_1 and 102_2 formed on a semiconductor substrate.

In a configuration as shown in FIGS. 7A and 7B, a difference is taken between a signal obtained from the photodiode 102_1 and a signal obtained from the photodiode 102_2, and focus detection of so-called phase difference detection type, is achieved to detect whether an object is in focus.

When the photoelectric conversion device is operated as described using FIG. 5, the signal (AA signal) from the photodiode 102_1 and a signal (AA signal+BB signal) from the photodiodes 102_1 and 102_2 are obtained. Accordingly, the AA signal and the BB signal are extracted from the signals, and the focus detection of phase difference detection type is may be performed. Further, the signal, AA signal+BB signal, is the sum of signals obtained through the same microlens 109, and thus the signal can be used as an image forming signal. In other words, according to the operation described using FIG. 5, not only the focus detection may be performed, but the image forming signal may be obtained.

A BB signal level is superposed on "reset level+AA signal level" having been clamped, a signal corresponding to "BB signal level" is AD-converted, and a period required for the AD conversion is reduced, also in the present embodiment. According to the present embodiment, by performing a high speed focus detection, a time required for focusing on the object may be reduced.

Fourth Embodiment

Figure 8:
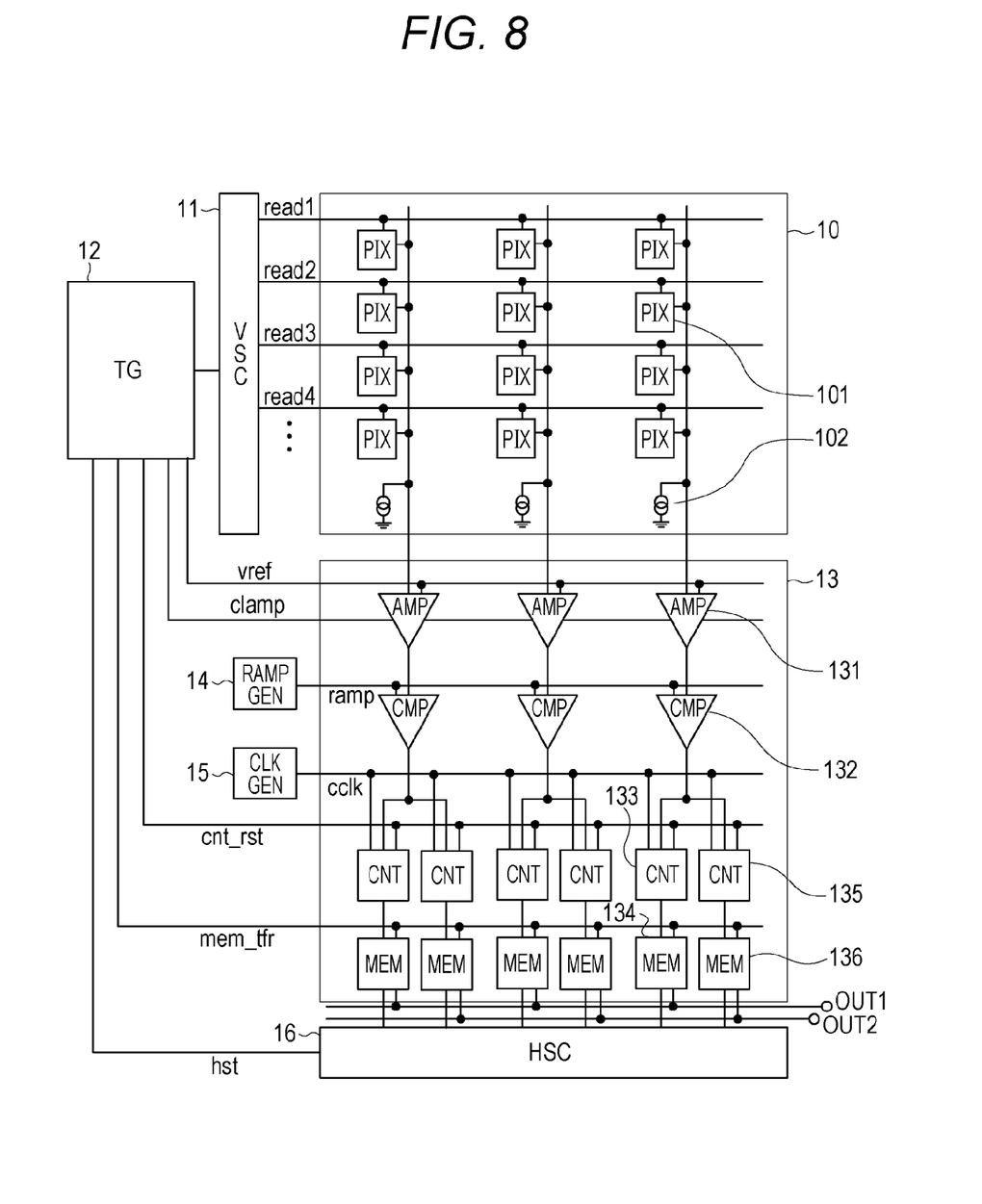
FIG. 8 is a diagram showing an exemplary structure of the photoelectric conversion device.

FIG. 8 is a block diagram showing an exemplary configuration of a photoelectric conversion device of the present embodiment. The photoelectric conversion device of the present embodiment is different from the photoelectric conversion device shown in FIG. 2 in that a second column counter unit 135 and a second column memory 136 are further included for one column comparison unit 132. A difference between the fourth embodiment and the first embodiment will be mainly described below.

The second column counter unit 135 and the second column memory 136 have configurations similar to those of a first column counter unit 133 as a first column counter unit and a column memory 134 as a first column memory. The first column counter unit 133 is different from the second column counter unit 135 in counting operation. More specifically, the first column counter unit 133 calculates the sum of signals based on two photodiodes included in a unit cell 101, whereas the second column counter unit 135 calculates a difference between signals based on the two photodiodes included in the unit cell 101.

Figure 9:
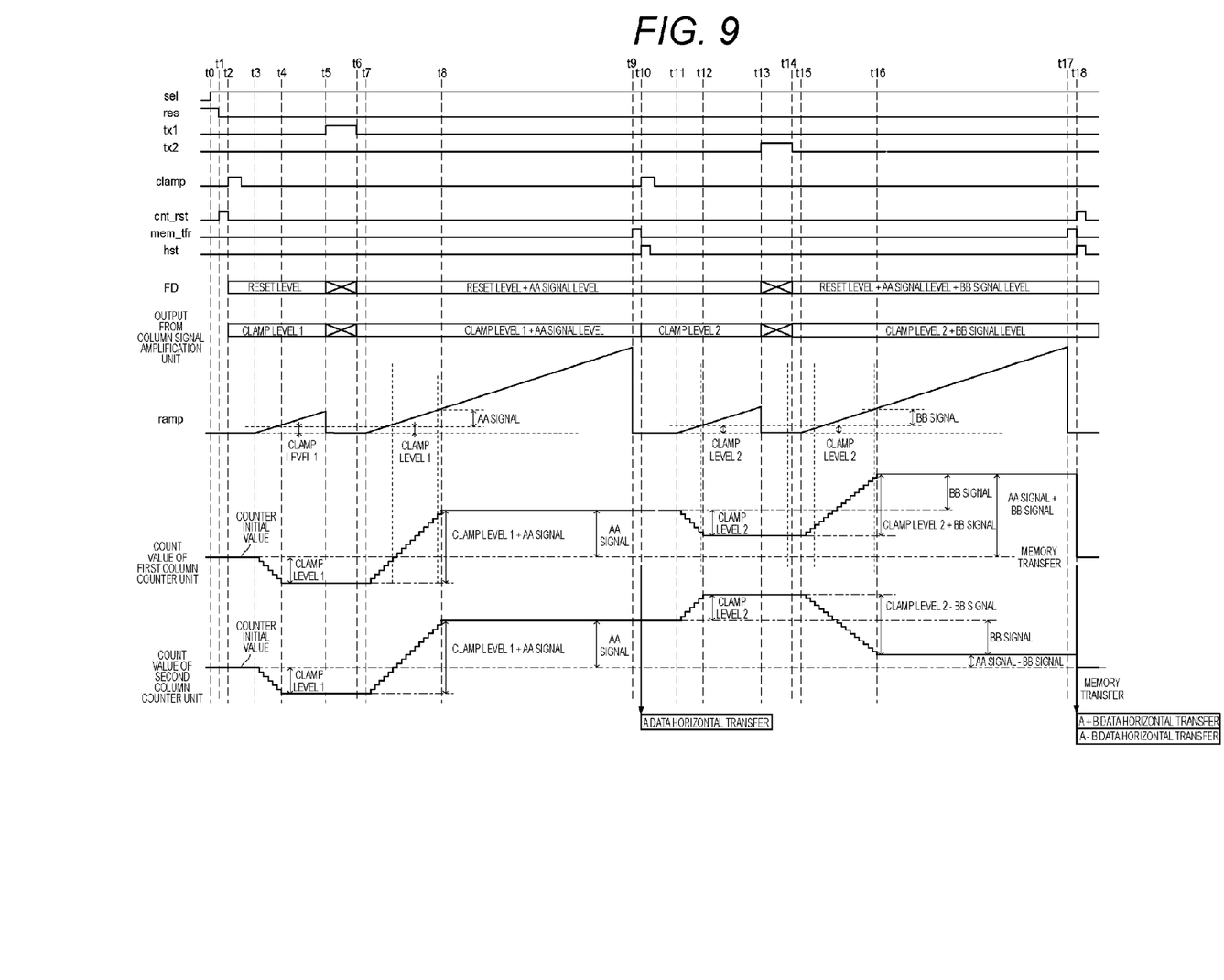
FIG. 9 is a diagram showing an exemplary operation according to an embodiment of the present invention.

FIG. 9 is a timing chart showing the operation of the present embodiment. The operation shown in FIG. 9 is different from the operation shown in FIG. 5 in that the operations of the second column counter unit 135 and the second column memory 136 are further included.

Similarly to the operation shown in FIG. 5, the first column counter unit 133 performs count-down operation from time t11, and performs count-up operation from time t15. On the other hand, the second column counter unit 135 performs count-up operation from time t11, and performs count-down operation from time t15. Thus, a signal "AA signal+BB signal" is obtained from the first column counter unit 133, and a signal "AA signal−BB signal" is obtained from the second column counter unit 135.

As shown in FIGS. 7A and 7B, in a configuration in which the same microlens is provided for the photodiodes 102_1 and 102_2, a difference between signals from the two photodiodes is obtained, and focus detection of a phase difference detection type may be performed. The configuration shown in FIG. 8 and the operation shown in FIG. 9 simultaneously provide the signal, "AA signal−BB signal" for the phase difference detection, and the image forming signal, "AA signal+BB signal".

The operation of "AA data horizontal transfer" performed from time t10 may be omitted.

A BB signal level is superposed on "reset level+AA signal level" having been clamped, a signal corresponding to "BB signal level" is AD-converted, and thus a period required for the AD conversion is reduced, also in the present embodiment. According to the present embodiment, by performing a high speed focus detection, time required for focusing on the object may be reduced. Further, according to the present embodiment, a signal "AA signal−BB signal" and a signal "AA signal+BB signal" may be obtained simultaneously.

(Others)

It is to be understood that the above-mentioned embodiments are illustrative and not restrictive in terms of carrying out the present invention.

For example, the counting operations, i.e., all of the count-up operation and the count-down operation may be reversed between the first column counter unit 133 and the second column counter unit 135. In such a configuration, a signal "−(AA signal+BB signal)" is obtained from the first column counter unit 133, and a signal "BB signal−AA signal" is obtained from the second column counter unit 135.

Further, AD conversion at a clamp level 1 and at a clamp level 2 may be omitted. In such a configuration, a finally obtained digital signal has remaining components of the clamp level 1 and clamp level 2, but the configuration allows a faster operation of the photoelectric conversion device.

In FIG. 5, during a period of AD conversion of the AA signal and the BB signal, the same counting operations, or count-up operations, are performed, and thus the signal, AA signal+BB signal, is obtained as a digital value. On the other hand, when different counting operations are performed between a period of AD conversion of the AA signal and a period of AD conversion of the BB signal, a digital signal corresponding to a difference between the AA signal and the BB signal is obtained.

The column AD conversion unit CAD may not include a column memory. In such a configuration, a count value held in a column counter unit is directly output from a photoelectric conversion device.

The type of the column AD conversion unit CAD is not limited to that described in the above-mentioned embodiments. For example, an AD converter of successive approximation type may be employed.

According to the above-mentioned embodiments, it is possible to speed up the operation of the photoelectric conversion device.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2013-184058, filed Sep. 5, 2013, which is hereby incorporated by reference herein in its entirety.

What is claimed is:

1. A photoelectric conversion device comprising:
 a cell array having a plurality of unit cells arranged in a matrix;
 a plurality of clamping units each provided corresponding to a column of the cell array; and a plurality of analog-to-digital (AD) conversion units each configured to convert a signal output from a corresponding clamping unit to a digital signal, each of the plurality of unit cells having:
- a first photoelectric conversion unit;
- a second photoelectric conversion unit; and
- an intra-cell amplification unit configured to amplify signals generated by the first and second photoelectric conversion units, wherein each of the plurality of AD conversion units AD-converts a first analog signal based on a signal generated at the first photoelectric conversion unit and output from the clamping unit, and AD-converts a second analog signal output from the clamping unit by applying a signal based on the signals generated by the first and second photoelectric conversion units to the clamping unit while the first analog signal is clamped at a reference level.

2. The photoelectric conversion device according to claim 1, wherein each of the plurality of AD conversion units comprises:
- a comparison unit configured to compare the signal output from the clamping unit with a reference signal that changes with time; and
- a counter unit configured to stop counting operation according to an output from the comparison unit.

3. The photoelectric conversion device according to claim 2, wherein the counter unit is configured to perform a same operation selected from among count-up operation and count-down operation during a period for an AD conversion of the signal based on the first photoelectric conversion unit and a period for an AD conversion of output from the clamping unit after the signals based on the first and second photoelectric conversion units have been applied to the clamping unit.

4. The photoelectric conversion device according to claim 2, wherein the counter unit is configured to perform one of count-up operation and count-down operation during a period for an AD conversion of the signal based on the first photoelectric conversion unit, and to perform the other of the count-up operation and the count-down operation during a period for an AD conversion of output from the clamping unit after the signals based on the first and second photoelectric conversion units have been applied to the clamping unit.

5. The photoelectric conversion device according to claim 2, wherein each of the AD conversion units further comprises another counter unit, and the counter unit and the another counter unit are configured to respectively perform different counting operations selected from among count-up operation and count-down operation during a period for AD conversion of output from the clamping unit after the signals based on the first and second photoelectric conversion units have been applied to the clamping unit.

6. The photoelectric conversion device according to claim 1, wherein the unit cells are provided with microlenses, respectively.

7. An imaging system comprising:
the photoelectric conversion device according to claim 1;
an optical system configured to form an image on the plurality of unit cells; and
a video signal processing unit configured to generate image data by processing signals output from the photoelectric conversion device.

8. An imaging system comprising:
the photoelectric conversion device according to claim 6;
an optical system configured to form an image on the plurality of unit cells; and
a video signal processing unit configured to generate image data by processing signals output from the photoelectric conversion device, wherein focus detection is performed based on the signal obtained by the AD conversion.

9. A method for driving a photoelectric conversion device comprising:
a cell array having a plurality of unit cells arranged in a matrix form; and
a plurality of clamping units provided corresponding to columns of the cell array;
the plurality of unit cells each comprising:
- a first photoelectric conversion unit;
- a second photoelectric conversion unit; and
- an intra-cell amplification unit configured to amplify signals generated at the first and second photoelectric conversion units, the method comprising:

AD-converting a first analog signal based on a signal generated at the first photoelectric conversion unit and output from a clamping unit by comparing the first analog signal with a reference signal changing with time; and AD-converting a second analog signal output from the clamping unit by applying a signal based on the signals generated by the first and second photoelectric conversion units to the clamping unit while the first analog signal is clamped at a reference level.

10. The method according to claim 9, wherein the AD converting comprises:
comparing the signal output from the clamping unit with a reference signal that changes with time; and
stopping counting operation according to an output from the comparing.

11. The method according to claim 10, wherein the counting includes performing a same operation selected from among count-up operation and count-down operation during a period for an AD-converting of the signal based on the AD-converting the first analog signal and a period for an AD converting of output from the clamping unit after the signals based on the AD-converting first and second analog signals have been applied to the clamping unit.

12. The method according to claim 10, wherein the counting includes performing one of count-up operation and count-down operation during a period for an AD conversion of the signal based on the AD-converting first analog signals, and performing the other of the count-up operation and the count-down operation during a period for an AD conversion of output from the clamping unit after the signals based on the AD-converting the first and second analog signals have been applied to the clamping unit.

13. The method according to claim 10, wherein each of the AD-converting further comprises another counting, and the counting and the another counting include performing different counting operations selected from among count-up operation and count-down operation during a period for AD conversion of output from the clamping unit after the signals based on the AD-converting first and second analog signals have been applied to the clamping unit.

14. The method according to claim 9, wherein the unit cells are provided with microlenses, respectively.

15. The method according to claim 9 further comprising:
forming an image on the plurality of unit cells; and
generating image data by processing signals output from the photoelectric conversion device.

16. The method according to claim 15, wherein focus detection is performed based on the signal obtained by the AD conversion.

* * * * *